(12) United States Patent
Mignano

(10) Patent No.: US 11,807,474 B2
(45) Date of Patent: Nov. 7, 2023

(54) CONVEYOR SYSTEM

(71) Applicant: OCM S.P.A., Sorbolo Mezzani (IT)

(72) Inventor: Paolo Mignano, Novara (IT)

(73) Assignee: Material Handling Systems, Inc., Mt. Washington (KY)

(*) Notice: Subject to any disclaimer, the term of this patent is extended or adjusted under 35 U.S.C. 154(b) by 0 days.

(21) Appl. No.: 17/760,918

(22) PCT Filed: Sep. 25, 2020

(86) PCT No.: PCT/EP2020/077001
§ 371 (c)(1),
(2) Date: Mar. 16, 2022

(87) PCT Pub. No.: WO2021/058799
PCT Pub. Date: Apr. 1, 2021

(65) Prior Publication Data
US 2022/0340378 A1    Oct. 27, 2022

(30) Foreign Application Priority Data
Sep. 27, 2019 (IT) .................. 102019000017438

(51) Int. Cl.
B65G 47/94 (2006.01)
B65G 35/06 (2006.01)
B65G 47/42 (2006.01)
B65G 17/34 (2006.01)

(52) U.S. Cl.
CPC ............ *B65G 47/94* (2013.01); *B65G 35/06* (2013.01); *B65G 47/42* (2013.01); *B65G 17/345* (2013.01)

(58) Field of Classification Search
CPC ...... B65G 47/42; B65G 17/345; B65G 47/94; B65G 35/06
USPC ........................................ 198/370.01, 370.06
See application file for complete search history.

(56) References Cited

U.S. PATENT DOCUMENTS

| 3,977,513 | A | * | 8/1976 | Rushforth | ............ | B65G 47/962 |
| | | | | | | 414/339 |
| 4,722,430 | A | * | 2/1988 | Canziani | ............ | B65G 47/962 |
| | | | | | | 198/374 |
| 5,894,919 | A | * | 4/1999 | Tacchi | ............ | B65G 47/962 |
| | | | | | | 198/370.01 |
| 6,571,933 | B1 | * | 6/2003 | Gortz | ............ | B65G 23/00 |
| | | | | | | 198/619 |

(Continued)

FOREIGN PATENT DOCUMENTS

EP           361340    *    4/1990    ............ B65G 23/23

OTHER PUBLICATIONS

Canadian Intellectual Property Office, Examiner's Report issued in corresponding Application No. CA 3,155,145, dated May 31, 2023.

(Continued)

*Primary Examiner* — James R Bidwell
(74) *Attorney, Agent, or Firm* — Stites & Harbison, PLLC; David W. Nagle, Jr.; James R. Hayne

(57) ABSTRACT

A conveyor system includes multiple carts that move along a rail. The rail includes a top panel upon which a vertical wheel of the cart is supported, along with a first side panel defining a channel within which a horizontal wheel of the cart is retained. One or more connector rails extend along the rail, and the cart is electrically connected to the one or more connector rails.

6 Claims, 5 Drawing Sheets

(56) References Cited

U.S. PATENT DOCUMENTS

| | | | | |
|---|---|---|---|---|
| 7,284,654 B2* | 10/2007 | Affaticati | ............. | B65G 47/962 |
| | | | | 198/370.04 |
| 8,770,380 B2* | 7/2014 | Polling | ................ | B65G 47/967 |
| | | | | 198/618 |
| 2015/0360869 A1* | 12/2015 | Bastian, II | ............. | B65G 43/08 |
| | | | | 198/370.06 |

OTHER PUBLICATIONS

China National Intellectual Property Administration, Office Action issued in corresponding Application No. 202080067595.6, dated Jul. 26, 2023.

* cited by examiner

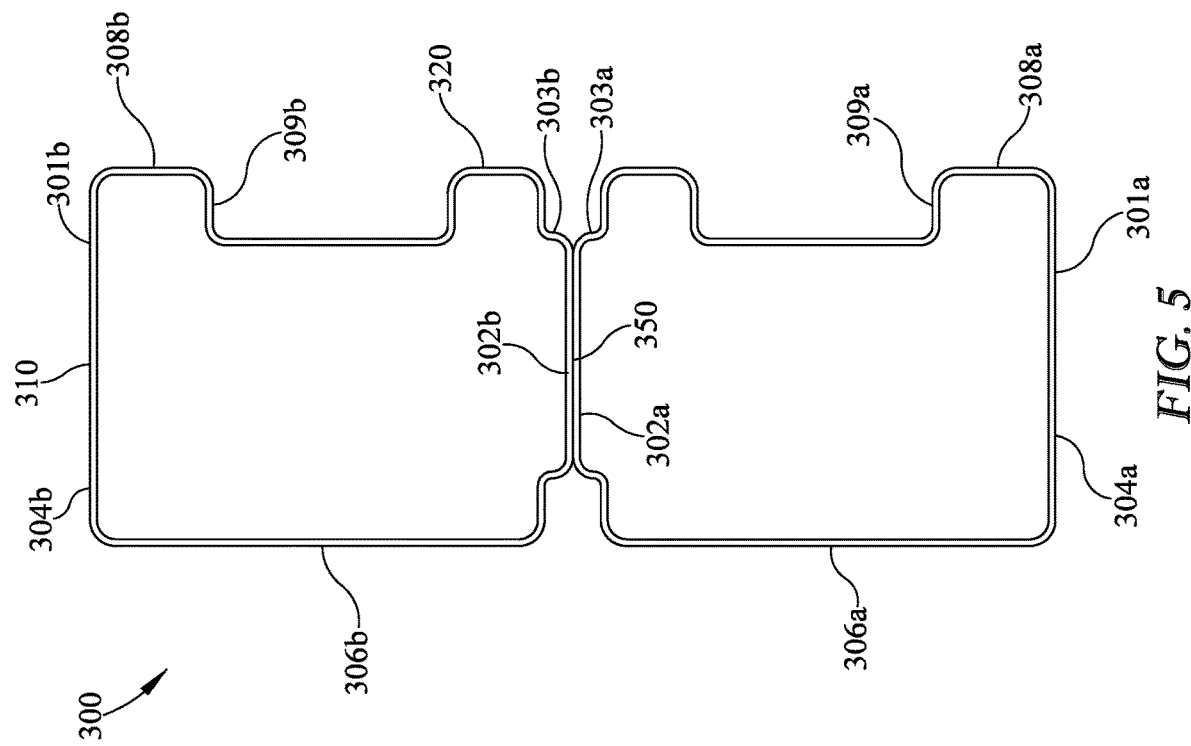

CONVEYOR SYSTEM

TECHNICAL FIELD

The present invention relates to a conveyor system that includes multiple carts that move along a track to deliver parcels to designated areas along the track.

BACKGROUND OF THE INVENTION

Cross-belt conveyor systems include multiple carts that move along a track. Each cart includes its own individual belt conveyor so that parcels on the cart can be moved to the left or right as the cart moves along the track. Typically, each cart includes wheels which run along rails forming the track. The rails generally used for a typical cross-belt conveyor system are made from aluminum, which has its own advantages such as malleability and easier connection with a wide variety of bolts. However, with aluminum rails, the wheels of the carts can experience significant wear at the point of contact of between wheels and the rail. One known means of solving this problem is to place a sheet of steel above the aluminum rail at the point of contact.

SUMMARY OF THE INVENTION

The present invention relates to a conveyor system that includes multiple carts that move along a track, for example a cross-belt conveyor system. The track typically includes two parallel rails to support the wheels of each cart.

One exemplary conveyor system made in accordance with the present invention comprises a track, which includes a variety of turns and changes in elevation. Multiple carts move along the track. Each cart includes vertical wheels and horizontal wheels which engage the track. In particular, a first set of wheels engages the first (or inner) rail, and a second set of wheels similarly engages the second (or outer) rail.

An exemplary rail includes a top panel, a first (or inner) side panel, a second (or outer) side panel, and a bottom panel, such that the rail defines a substantially enclosed inner space. A vertical wheel of the cart is supported by the top panel of the rail, and a horizontal wheel of the cart engages the first side panel. More specifically, the first side panel defines a first (or wheel) channel within which the horizontal wheel of the cart is retained.

In some embodiments, the cart is also electrically connected to the rail. In particular, the cart further includes an arm that extends downward from the base of the cart. At the end of the arm are multiple current collectors, each of which engage a respective connector rail extending around the track.

To this end, the first side panel of the rail further defines a second (or bolt) channel that extends along the length of the rail. A clamp is secured to the rail by a bolt within the bolt channel. Each of the multiple connector rails is secured to the rail by the clamp. The connector rails extend along substantially the entire length of the rail around the entirety of the track. Multiple clamps are spaced along the length of the rail to adequately secure the connector rails to the rail. In one particular embodiment, the clamps are spaced about one meter (1 m) apart along the track. In this way, as a cart moves around the track, the current collectors of the cart remain in contact with the connector rails to thereby maintain electrical connection between electronic devices on the cart and external electronic devices.

Similar to the first side panel, the second side panel and the bottom panel each define a respective bolt channel that extends along the length of the rail (i.e., around the track). In some implementations, the bolt channels of the second side panel and the bottom panel are used to connect the rail to a support frame of the conveyor system with bolts. However, the bolt channels of the second side panel and the bottom panel could also be used to attach other accessories (e.g., sensors or controllers) to the rail. In other words, the bolt channels provide a connection point to the rail along the entire length of the track.

In some embodiments, the first and second rails are substantially identical, but a mirror images. In certain embodiments, only one rail includes the clamps and plurality of connector rails. In other embodiments, however, both rails can include similar clamps and plurality of connector rails.

Another exemplary rail is comprised of two substantially identical members that are connected to form the rail. In particular, a first member includes a first panel, a second panel opposite the first panel, a third panel that extends between the first panel and the second panel, and a fourth panel that extends between the first panel and the second panel opposite from the third panel. Each of the panels is substantially flat, except the first panel includes a projection, and the fourth panel defines a channel, as discussed further below.

The second member similarly includes a first panel with a projection, a second panel opposite the first panel, a third panel that extends between the first panel and the second panel, and a fourth panel that extends between the first panel and the second panel opposite from the third panel and which defines a channel.

In some embodiments, the second member is a mirror image of the first member, and the first panel of the second member is connected (e.g., welded) to the first panel of the first member to thereby form an intermediate panel that bifurcates the inner space of the rail. The projection of the first panel of the first member and the projection of the first panel of the second member facilitate in the welding of the first member to the second member.

The second panel of the second member forms a top panel of the rail upon which a vertical wheel of the cart is supported. The fourth panel of the first member and the fourth panel of the second member collectively form a first (or inner) side panel of the rail with the channel of the fourth panel of the second member retaining a horizontal wheel of the cart.

The intermediate panel of the rail increases the rigidity of the rail which provides a greater bending radius for the rail. In some embodiments, the rail has a bending diameter of about 4000 mm for horizontal turns in the track and can provide an angle of inclination at elevation changes in the track of about 12°. The rail can therefore be used for any section of the track including a horizontal curve, an elevation change, or where both a horizontal curve and elevation change occurs simultaneously on the track.

Regardless of the particular configuration, in some embodiments, the rails of the present invention are made of cold-rolled steel. In some embodiments, the rails are made of stainless steel. This provides an improvement over aluminum rails which cause wear in the wheels of each cart at the point of contact between the wheels and the rail without also requiring any additional protection at this point of contact.

DESCRIPTION OF THE DRAWINGS

FIG. 5 is a cross-sectional view of another exemplary rail made in accordance with the present invention.

DESCRIPTION OF THE INVENTION

The present invention relates to a conveyor system that includes multiple carts that move along a track, for example a cross-belt conveyor system. The track typically includes two parallel rails to support the wheels of each cart.

Figure 1:
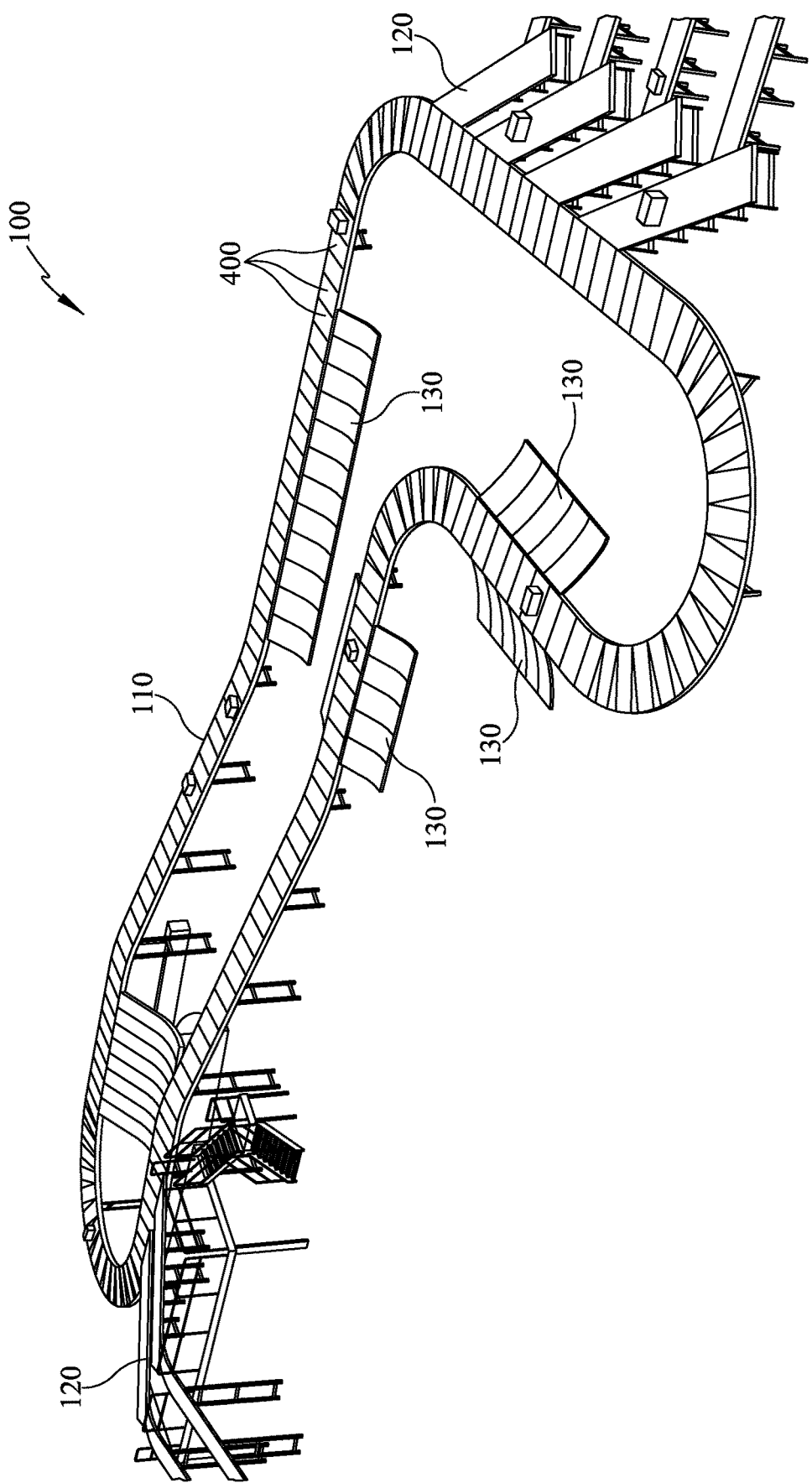
FIG. 1 is a perspective view of an exemplary conveyor system made in accordance with the present invention.

Referring first to FIG. 1, an exemplary conveyor system 100 made in accordance with the present invention comprises a track 110, which includes a variety of turns and changes in elevation. The conveyor system 100 further includes multiple carts 400 that move along the track 110 and one or more feeder belts 120 that provide parcels onto the carts 400. The carts 400 then deposit these parcels into one or more sorter bins 130.

Figure 2:
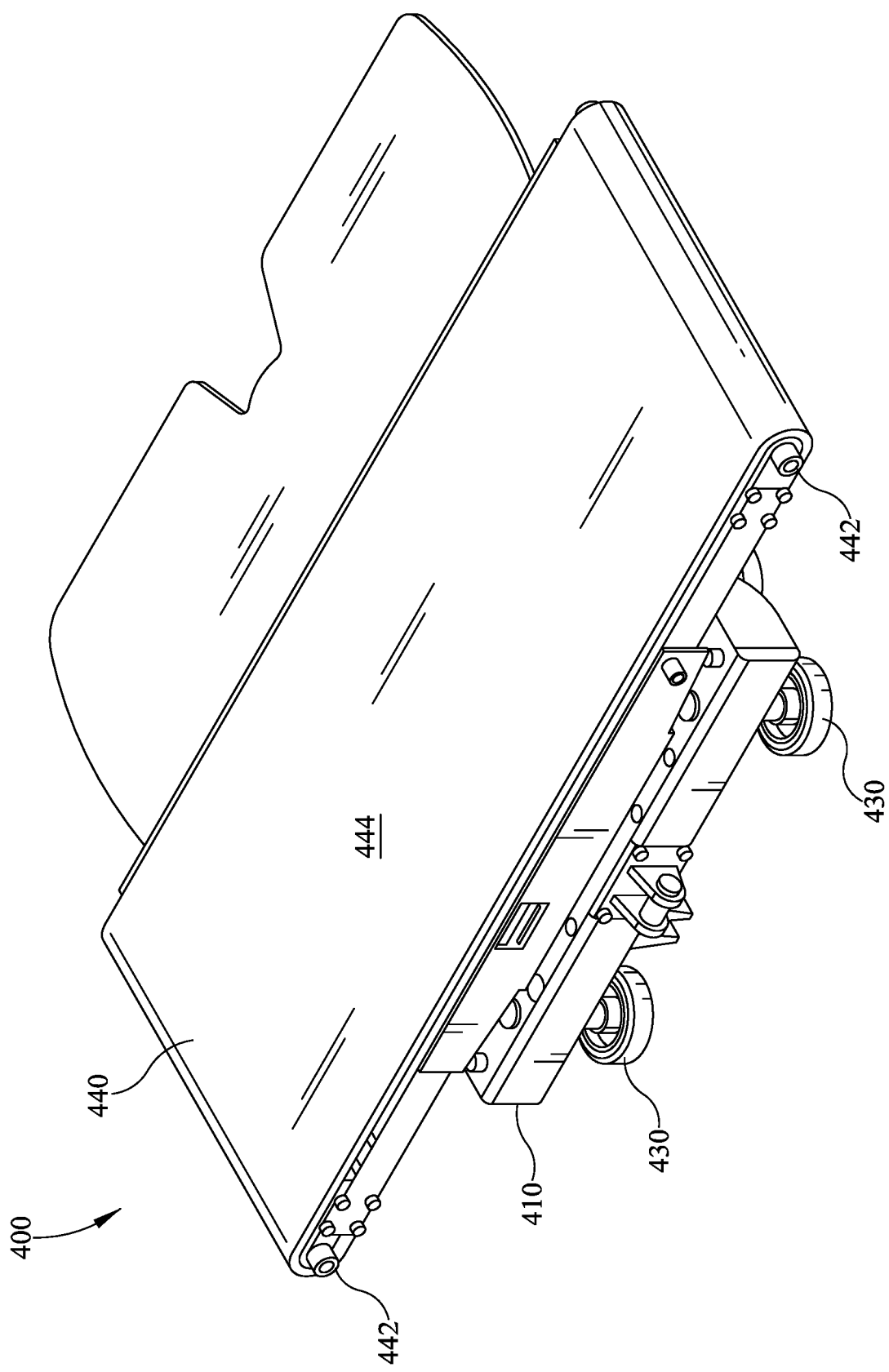
FIG. 2 is a perspective view of a cart of the conveyor system of FIG. 1 shown in isolation.
Figure 3:
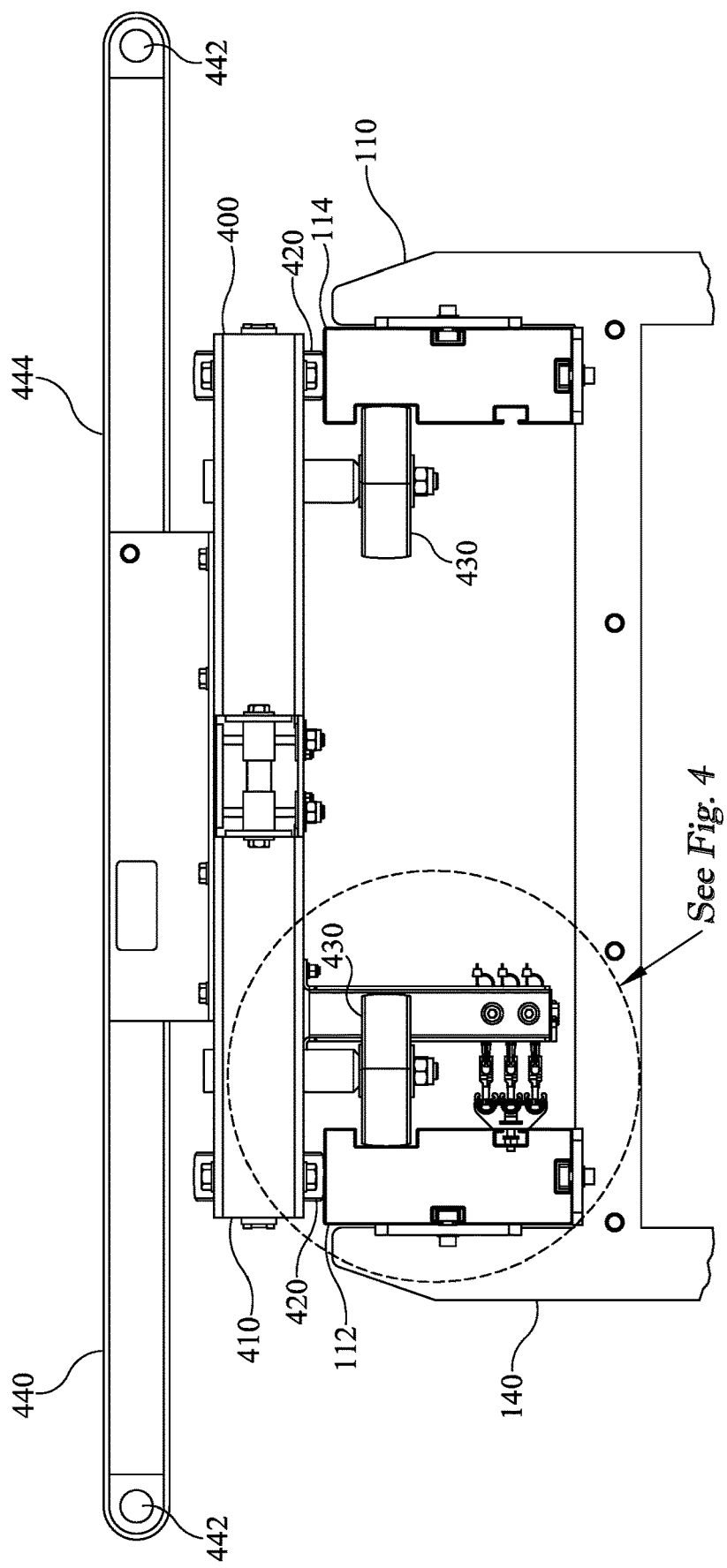
FIG. 3 is cross-sectional view of a cart on the track of the conveyor system of FIG. 1.

Referring now to FIGS. 2 and 3, and with respect to the carts 400 of the present invention, an exemplary cart 400 includes a base 410 with a belt conveyor 440 connected to the top of the base 410. The belt conveyor including rollers 442 and a belt 444 which operate in a direction perpendicular to the direction of travel of the base 410 along the track 110. As such, while the cart 400 moves along the track 110, the conveyor 440 can readily accept parcels from the feeder belts 120 on either side of the cart 400 and deposit the parcels into the sorter bins 130 on either side of the cart 400.

The cart 400 further includes vertical wheels 420 (shown only in FIG. 3) and horizontal wheels 430 which engage the track 110. In particular, as shown in FIG. 3, the track 110 includes a first (or inner) rail 112 and a second (or outer) rail 114 which run parallel to one another. A first set of wheels 420, 430 engages the first rail 112 and a second set of wheels 420, 430 similarly engages the second rail 114. Each of the first and second rails 112, 114 is supported by a support frame 140, as discussed further below.

Figure 4:
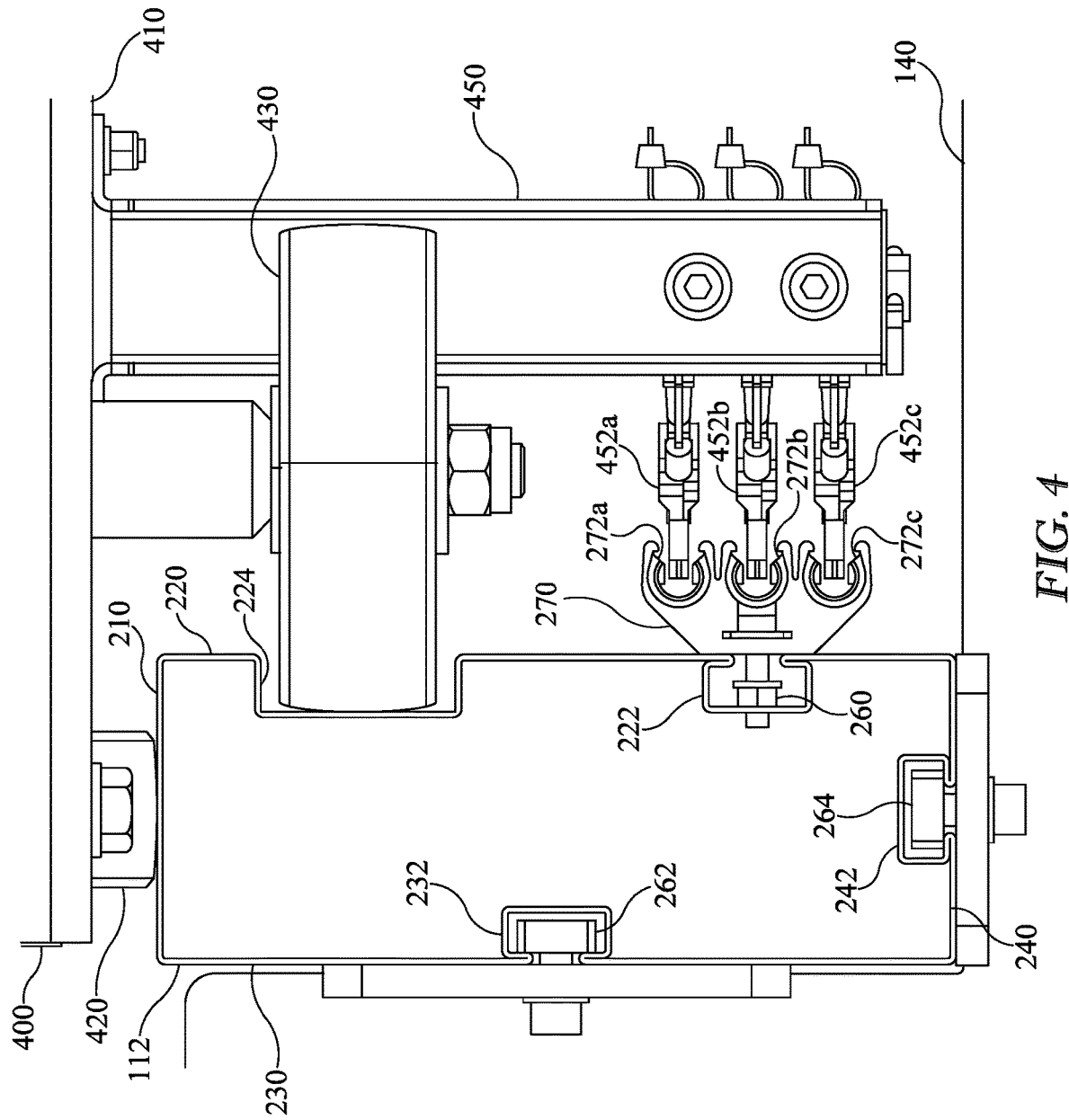
FIG. 4 is a detailed view of one of the rails of the track of FIG. 3.

Referring now to FIGS. 3 and 4, and with respect to the first rail 112 in particular, the exemplary first rail 112 includes a top panel 210, a first (or inner) side panel 220, a second (or outer) side panel 230, and a bottom panel 240, such that the first rail 112 defines a substantially enclosed inner space. A vertical wheel 420 of the cart 400 is supported by the top panel 210 of the first rail 112, and a horizontal wheel 430 of the cart 400 engages the first side panel 220. More specifically, the first side panel 220 defines a first (or wheel) channel 224 within which the horizontal wheel 430 of the cart 400 is retained.

Referring still to FIGS. 3 and 4, the cart 400 is also electrically connected to the first rail 112. In particular, the cart 400 further includes an arm 450 that extends downward from the base 410 of the cart 400. At the end of the arm 450 are multiple (three) current collectors 452a, 452b, 452c which engage a respective connector rail 272a, 272b, 272c extending around the track 110.

To this end, the first side panel 220 of the first rail 112 further defines a second (or bolt) channel 222 that extends along the length of the first rail 112. A clamp 270 is secured to the first rail 112 by a bolt 260 within the bolt channel 222. Each of the multiple (three) connector rails 272a, 272b, 272c is thereby secured to the first rail 112 by the clamp 270. Although not expressly shown, the connector rails 272a, 272b, 272c extend along substantially the entire length of the first rail 112 around the entirety of the track 110. Multiple clamps 270 are spaced along the length of the first rail 112 to adequately secure the connector rails 272a, 272b, 272c to the first rail 112. In one particular embodiment, the clamps 270 are spaced about one meter (1 m) apart along the track 110. Of course, the particular spacing of the clamps 270 can be modified according to the particular configuration and requirements of the track 110. In this way, as the cart 400 moves around the track 110, the current collectors 452a, 452b, 452c of the cart 400 remain in contact with the connector rails 272a, 272b, 272c to thereby maintain electrical connection between electronic devices on the cart 400 and external electronic devices.

Similar to the first side panel 220, the second side panel 230 and the bottom panel 240 each define a respective bolt channel 232, 242 that extends along the length of the first rail 112 (i.e., around the track 110). In the embodiment shown in FIGS. 3 and 4, the bolt channels 232, 242 of the second side panel 230 and the bottom panel 240 are used to connect the first rail 112 to the support frame 140 of the conveyor system 100 with bolts 262, 264. However, the bolt channels 232, 242 of the second side panel 230 and the bottom panel 240 could also be used to attach other accessories (e.g., sensors or controllers) to the first rail 112. In other words, the bolt channels 232, 242 provide a connection point to the first rail 112 along the entire length of the track 110.

The second rail 114 is substantially identical to the first rail 112, but a mirror image thereof. In the embodiment shown in FIG. 3, only the first rail 112 includes the clamp 270 and plurality of connector rails 272a, 272b, 272c. In other embodiments, however, the second rail 114 can also include a clamp and plurality of connector rails either instead of, or in addition to, the clamp 270 and plurality of connector rails 272a, 272b, 272c connected to the first rail 112.

Referring now to FIG. 5, in another exemplary embodiment, two substantially identical members are connected to form a rail 300 (i.e., either the first rail and/or the second rail). The exemplary rail 300 shown in FIG. 5 includes a first member 301a and a second member 301b. The first member 301a includes a first panel 302a, a second panel 304a opposite the first panel 302a, a third panel 306a that extends between the first panel 302a and the second panel 304a, and a fourth panel 308a that extends between the first panel 302a and the second panel 304a opposite from the third panel 306a. Each of the panels 302a, 304a, 306a, 308a is substantially flat, except the first panel 302a includes a projection 303a, and the fourth panel 308a defines a channel 309a, as discussed further below.

The second member 301b similarly includes a first panel 302b with a projection 303b, a second panel 304b opposite the first panel 302b, a third panel 306b that extends between the first panel 302b and the second panel 304b, and a fourth panel 308b that extends between the first panel 302b and the second panel 304b opposite from the third panel 306b and which defines a channel 309b.

As shown in FIG. 5, the second member 301b is a mirror image of the first member 301a, and the first and second members 301a, 301b are connected to form the rail 300. In particular, the first panel 302b of the second member 301b is connected (e.g., welded) to the first panel 302a of the first member 301a to thereby form an intermediate panel 350 of the rail 300 that bifurcates the inner space of the rail 300. The projection 303a of the first panel 302a of the first member 301a and the projection 303b of the first panel 302b of the second member 301b facilitate in the welding of the first member 301a to the second member 301b.

The second panel 304b of the second member 301b forms a top panel 310 of the rail 300 upon which a vertical wheel of the cart (not shown) is supported in substantially the same manner as the top panel 210 of the first rail 112 described above with respect to FIGS. 3 and 4. The fourth panel 308a of the first member 301a and the fourth panel 308b of the second member 301b collectively form a first (or inner) side panel 320 of the rail 300 with the channel 309b of the fourth panel 308b of the second member 301b retaining a horizontal wheel of the cart (not shown) in substantially the same manner as the first side panel 220 of the first rail 112 described above with respect to FIGS. 3 and 4.

It is contemplated that the rails 112, 114 shown in FIG. 3 are preferably used in straight sections of the track 110, whereas the rail 300 shown in FIG. 5 is preferably used in curved sections of the track 110. To this end, the overall shape of the rail 300 shown in FIG. 5 is designed to be substantially the same as the shape of the rails 112, 114 shown in FIG. 3, such that a cart 400 can easily transition between those portions of the track 110 formed of the rails 112, 114 shown in FIG. 3 and those portions of the track 110 formed of the rail 300 shown in FIG. 5.

With respect to the use of the rail 300 shown in FIG. 5 in curved sections of the track 110, the intermediate panel 350 of the rail 300 shown in FIG. 5 increases the rigidity of the rail 300 as compared to the rails 112, 114 shown in FIG. 3. This provides a greater bending radius for the rail 300 shown in FIG. 5. In some embodiments, the rail 300 shown in FIG. 5 has a bending diameter of about 4000 mm for horizontal turns in the track 110 and can provide an angle of inclination at elevation changes in the track 110 of about 12°. The rail 300 can therefore be used for any section of the track 110 including a horizontal curve, an elevation change, or where both a horizontal curve and elevation change occurs simultaneously on the track 110.

Regardless of the particular configuration, in some embodiments, the rails of the present invention are made of cold-rolled steel. In some embodiments, the rails are made of stainless steel. This provides an improvement over aluminum rails which cause wear in the wheels of each cart at the point of contact between the wheels and the rail without also requiring any additional protection at this point of contact.

One of ordinary skill in the art will also recognize that additional embodiments are also possible without departing from the teachings of the present invention. This detailed description, and particularly the specific details of the exemplary embodiments disclosed therein, is given primarily for clarity of understanding, and no unnecessary limitations are to be understood therefrom, for modifications will become obvious to those skilled in the art upon reading this disclosure and may be made without departing from the spirit or scope of the present invention.

What is claimed is:

1. A conveyor system including a cart that moves along a rail, the rail comprising:
   a first member, including
      a first panel,
      a second panel opposite the first panel,
      a third panel extending between the first panel and the second panel, and
      a fourth panel extending between the first panel and the second panel opposite from the third panel, the fourth panel defining a channel; and
   a second member, including
      a first panel,
      a second panel opposite the first panel,
      a third panel extending between the first panel and the second panel, and
      a fourth panel extending between the first panel and the second panel, the fourth panel defining a channel;
   wherein the first panel of the second member is connected to the first panel of the first member, such that (a) the second panel of the second member forms a top panel of the rail upon which a vertical wheel of the cart is supported, (b) the fourth panel of the first member and the fourth panel of the second member collectively form a first side panel of the rail, and (c) a horizontal wheel of the cart is retained within the channel defined by the fourth panel of the second member.

2. The conveyor system of claim 1, wherein the second member is substantially a mirror image of the first member.

3. The conveyor system of claim 1, wherein the first panel of the first member includes a projection, the first panel of the second member includes a projection, and the projection of the first member is connected to the projection of the second member.

4. The conveyor system of claim 1, wherein the first panel of the second member is welded to the first panel of the first member.

5. A conveyor system including a cart that moves along a track including an inner rail and an outer rail, each of the inner rail and the outer rail comprising:
   a top panel;
   a bottom panel opposite the top panel;
   an inner side panel defining a channel; and
   an outer side panel, such that each of the inner rail and the outer rail defines a substantially enclosed inner space;
   wherein the top panel of each of the inner rail and the outer rail supports a vertical wheel of the cart and the channel of the inner side panel retains a horizontal wheel of the cart;
   wherein the inner side panel of the inner rail, the inner side panel of the outer rail, or both the inner side panel of the inner rail and the inner side panel of the outer rail further defines a second channel; and
   wherein multiple clamps are positioned within the second channel, one or more connector rails are secured to the rail by the multiple clamps, and the cart is electrically connected to the one or more connector rails.

6. A conveyor system including a cart that moves along a track including an inner rail and an outer rail, each of the inner rail and the outer rail comprising:
   a top panel;
   a bottom panel opposite the top panel;
   an inner side panel defining a channel; and
   an outer side panel, such that each of the inner rail and the outer rail defines a substantially enclosed inner space;
   wherein the top panel of each of the inner rail and the outer rail supports a vertical wheel of the cart and the channel of the inner side panel retains a horizontal wheel of the cart; and
   wherein the inner rail, the outer rail, or both the inner rail and the outer rail further comprise an intermediate panel extending between the inner side panel and the outer side panel to bifurcate the inner space.

\* \* \* \* \*